United States Patent [19]
Verbiest

[11] Patent Number: 4,833,543
[45] Date of Patent: May 23, 1989

[54] IMAGE PROCESSING SYSTEM AND PHASELOCKED LOOP USED THEREIN

[75] Inventor: Willem J. A. Verbiest, Zwijndrecht, Belgium

[73] Assignee: Alcatel N.V., Amsterdam, Netherlands

[21] Appl. No.: 946,744

[22] Filed: Dec. 24, 1986

[30] Foreign Application Priority Data

Jan. 24, 1986 [BE] Belgium .................................. 60911

[51] Int. Cl.⁴ ............................................. H04N 1/415
[52] U.S. Cl. .................................... 358/260; 358/280; 358/283
[58] Field of Search ............... 358/280, 260, 282, 256, 358/287

[56] References Cited

U.S. PATENT DOCUMENTS

| | | | |
|---|---|---|---|
| 4,620,233 | 10/1986 | Ogawa | 358/260 |
| 4,698,689 | 10/1987 | Tzou | 358/260 |
| 4,754,492 | 6/1988 | Macvar | 358/260 |
| 4,760,460 | 7/1988 | Shimotohno | 358/283 |

FOREIGN PATENT DOCUMENTS 17248 1/1984 Australia.
27683 11/1984 Australia.

Primary Examiner—Edward L. Coles, Sr.
Attorney, Agent, or Firm—Christie, Parker & Hale

[57] ABSTRACT

The image processing system includes a fast packet switching network (PSNW) to which send an receive stations (SR, RC) are connected. Each image (AA) to be transmitted is subdivided into blocks by a grid (GR) which is displaceable with respect to the image and the groups of image signals corresponding to these blocks are encoded and transmitted to the network together with a signal (DX, DY), indicating the grid position, as a bitstream having a variable bitrate. The grid position is changed for each image transmission and in the receiver station use is made of a phaselocked loop (PLL) to derive a clock signal from reference signals of this bitstream.

15 Claims, 4 Drawing Sheets

IMAGE PROCESSING SYSTEM AND PHASELOCKED LOOP USED THEREIN

The present invention relates to an image processing system with at least a sender station and a receiver station, said sender station including means generating sets of signals, each set relating at least to the image elements of an image area, control means for subdividing the signals of each set into groups corresponding to blocks of said image area, means for encoding said groups of signals, and means for transmitting the thus obtained groups of encoded signals to said receiving station which includes means for reconstructing said image area by making use of said encoded signals.

Such an image processing system is already known e.g. from the article "Block Distortion in Orthogonal Transform Coding—Analysis, Minimization and Distortion Measure" by Makoto Miyahara et al, published in the IEEE Transactions on Communications, Vol. COM-33, No 1, January 1985, pp 90-96. As mentioned in this article, due to errors such a block encoding may bring about distortions that manifest themselves in the reconstructed image as discontinuities at the edges of the blocks. These discontinuities are very objectionable to the viewer of this image, and to reduce them the article proposes a new coding algorithm.

An object of the present invention is to provide an image processing system of the type described above, but which independently from the coding algorithm used considerably increases the quality of the reconstructed image.

According to the invention, this object is achieved due to the fact that said control means are able to change said subdivision with respect to a previous subdivision.

In this way, the positions of the edges of the blocks in successive reconstructed images are modified so that the discontinuities at these edges are no longer objectionable to the viewer.

The present invention also relates to a phaselocked loop including a clock input signal generating circuit which is coupled through a variable delay circuit to a multiplexer circuit which provides a clock output signal applied to a first input of a phase detector whose second input is the input of the loop and whose output on which a phase error signal is generated is coupled to a bidirectional counter which controls said multiplexer circuit.

Such a phaselocked loop is already known from the Belgian Pat. No. 888,265 (J. L. Calvez 5). This known loop is an analogous loop and is adapted to process input signals which include reference signals occurring at regular time instants.

Another object of the present invention is to provide a phaselocked loop of the above type but which is adapted to process input signals including reference signals occurring at irregular time instants.

According to the invention, this object is achieved due to the fact that the output of said phase detector is coupled to said bidirectional counter through latch means which are controlled by reference signals forming part of a digital bitstream applied to said loop input and which latch each said phase error for a time interval between successive reference signals.

Because the phase error is latched between successive reference signals, these may arrive on irregular time instants as is for instance the case for a bitstream having a variable bitrate.

The present invention further also relates to a data processing system with at least one sender station coupled to at least one receiver station through a switching network, said sender station including encoder means for encoding data signals prior to applying them to said switching network.

This system is characterized in that said encoder means provide at their output an encoded bitstream having a variable bitrate, and that said sender station further includes means to apply said encoded bitstream directly to said switching network.

Thus it is not required that the encoder means generate at their output a bitstream having a fixed bitrate before applying this bitstream to the switching network, this being contrary to the generally used procedure.

The above mentioned and other objects and features of the invention will become more apparent and the invention itself will be best understood by referring to the following description of an embodiment taken in conjunction with the accompanying drawings wherein.

Figure 1:
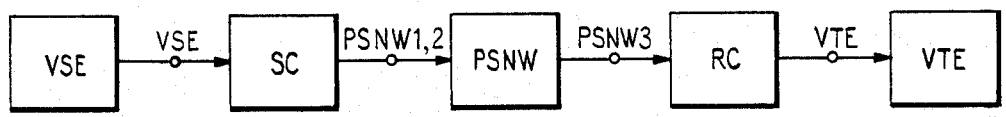
FIG. 1 is a block diagram of an image processing system according to the invention.

The image processing system shown in FIG. 1 includes a packet switching network PSNW to which a plurality of subscriber stations have access. This network is a fast packet switching network for instance operating at a rate of 280 Megabit/sec. which is large compared to the operation speed of e.g. 48 kilobit/sec. of a classical packet switching network. Each subscriber station includes a sender equipment comprising a video source equipment VSE which is coupled to the network PSNW through a sender circuit SC, as well as a receiver equipment comprising a video terminal equipment VTE to which the Network PSNW is coupled via a receiver circuit RC. FIG. 1 represents the sender and receiver equipments of two different subscriber stations. The circuits VSE and SC have respective outputs VSE and PSNW1, PSNW2 whilst the circuits RC and VTE have respective inputs PSNW3 and VTE respectively.

Figure 2:
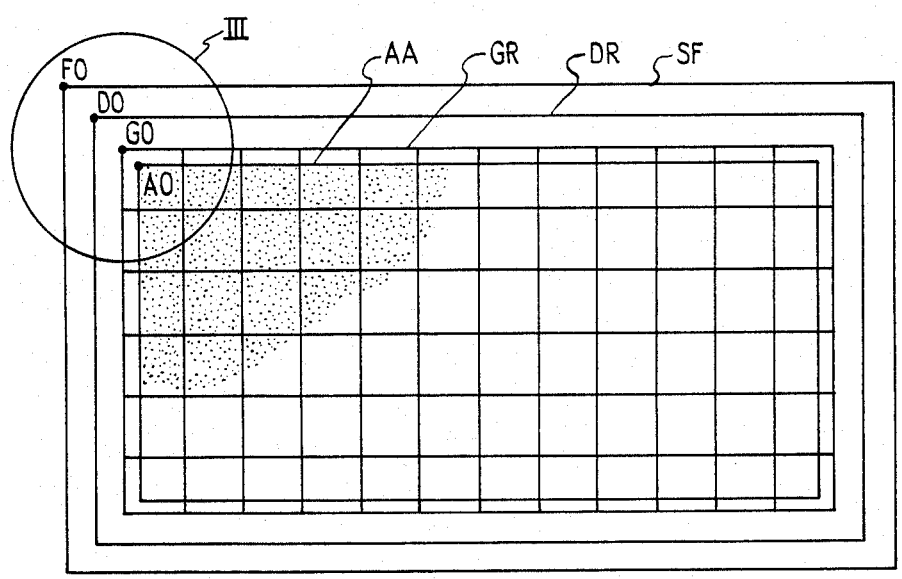
FIG. 2 shows a scanning field SF of the video source equipment VSE of FIG. 1.
Figure 3:
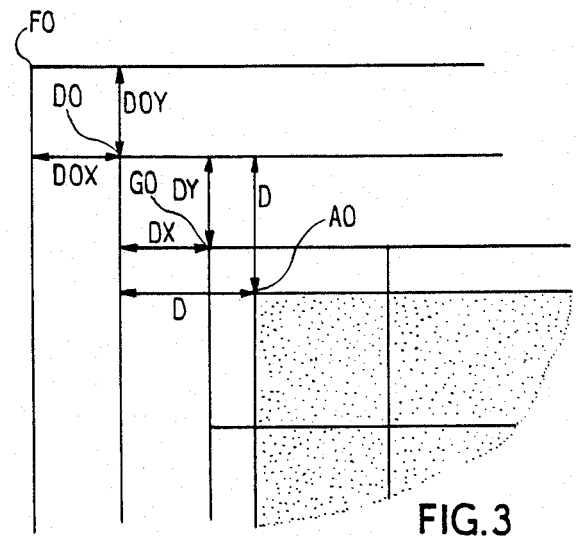
FIG. 3 represents part III of FIG. 2 on a larger scale.

The video source equipment VSE is for instance a video camera which is able to scan an object horizontally from left to right and vertically from top to bottom in a rectangular scanning field SF shown in FIGS. 2 and 3 and having a vertex or origin FO. Two successive scans are performed along odd and even numbered lines of a frame respectively, each scan producing a field of analog video signals. This happens for instance at a rate of 50 per second. When the analog video signals provided by VSE are applied to a video monitor (not shown) the image taken is visible in the rectangular image area AA of picture elements or pixels represented by black dots in Fys. 2 and 3. This image area AA has vertex or origin AO. The unvisible portion of the scanning field SF located outside the image area AA is the so-called blanking field and is used for synchronization purposes.

As will be explained later, the sender circuit SC is able to transmit an image, appearing in the image area AA, under the form of blocks into which the image is subdivided by a displaceable fictive rectangular grid which is designated by GR in FIGS. 2 and 3 and has an origin GO. It is constituted by a set of like square grid blocks arranged in horizontal rows and vertical columns and subdividing the image area AA in image blocks of which those at the borders of this area have a surface smaller than that of a grid block. It is clear, when the grid GR is displaced, that the surfaces of the last mentioned image blocks at the border of the area AA are changed unless the grid origin GO is horizontally and vertically displaced over a distance equal to the width of a grid block. Indeed, in this case the surfaces of these image blocks of the image area AA remain the same. For this reason the displacement of the grid origin GO in horizontal and vertical directions is limited to a maximum D equal to the width of a grid block less the distance between two adjacent pixels. The displacements of the grid origin GO may therefore be measured with respect to horizontal and vertical sides of a rectangular region DR which intersect in an origin DO which is such that with respect to these sides the origin AO has coordinates equal to D. The coordinates of the grid origin GO with respect to the same sides are indicated by DX and DY and these values which are indicative of the grid position are changed prior to each image transmission. It should be noted that the origin DO is positioned at constant distances equal to DOX and DOY from the horizontal and vertical sides of SF intersecting in FO.

Figure 4:
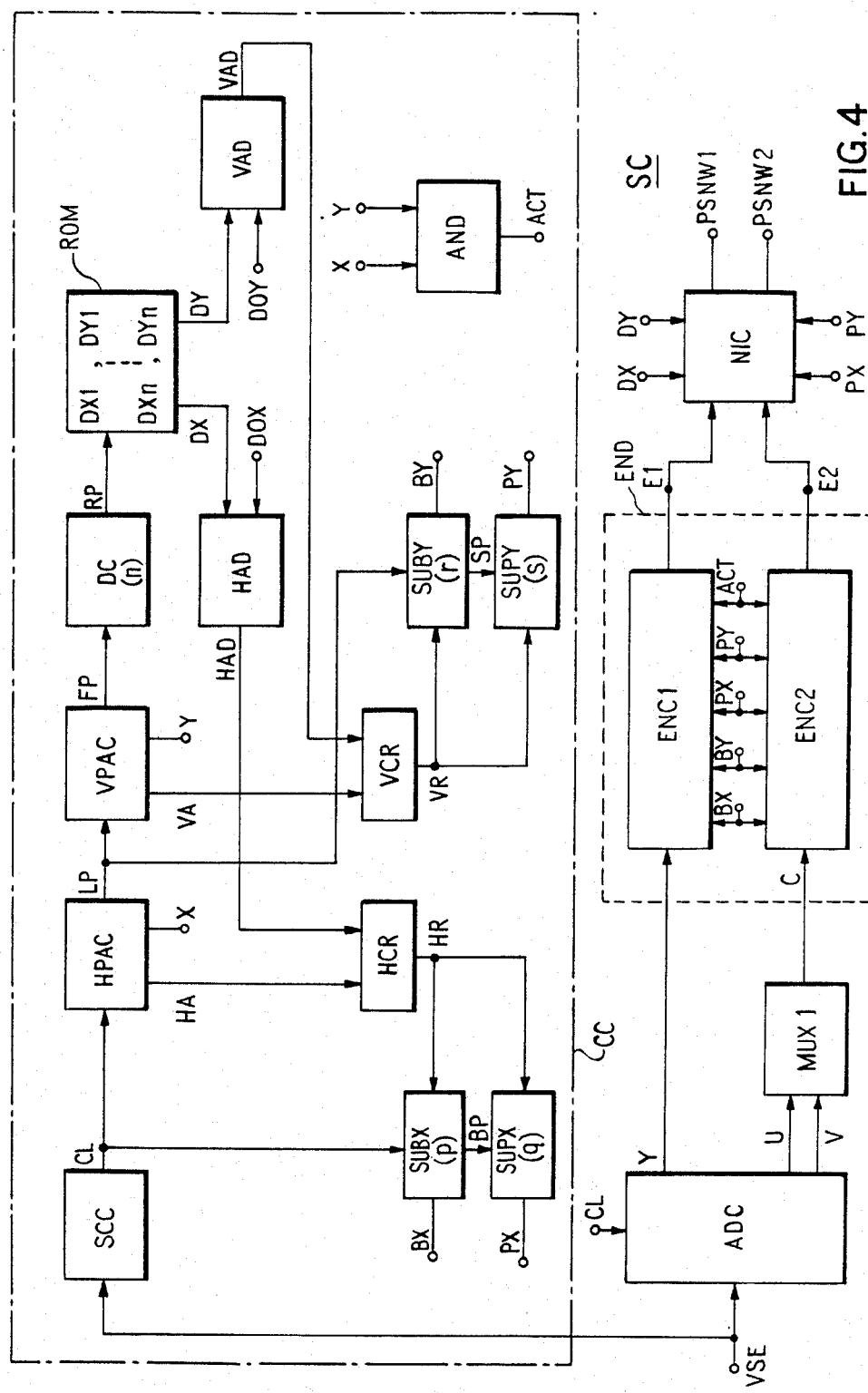
FIG. 4 is a block diagram of the sender circuit SC of FIG. 1.

Reference is now made to FIG. 4 which shows a block diagram of the sender circuit SC. This circuit mainly performs the following functions:

it provides for each image to be transmitted a new position of the grid GR, i.e. a new value of the pair of coordinates DX and DY of the grid origin GO with respect to the origin DO. This is done on a pseudo-random basis;

it determines for the new values of DX and DY the new coordinates of the pixels in a grid block and of the blocks in the grid and supplies this control information to an encoder;

it performs a conversion of the above analog signal into a digital bitstream, then performes an encoding operation of this bitstream and finally transmits the encoded bitstream together with the values DX and DY and other control information to the network PSNW.

The sender circuit SC has an input VSE to which the like named output of the video source equipment VSE is connected and outputs PSNW1 and PSNW2 connected to like named inputs of the switching network PSNW.

The input VSE is connected to an analog-to-digital converter ADC which is controlled by a clock signal CL and wherein the analog video signals supplied to this input VSE are converted to a digital bitstream. When supposing that the image taken by the above mentioned video camera is a colour image the ADC provides at its outputs three separate digital bitstreams Y, U and V wherein Y is a luminance bitstream and U and V are chrominance bitstreams, U and V having a frequency which is half that of the bitstream Y. The bitstream Y is directly applied to an encoder circuit ENC1 of an encoder device END, whereas the bitstreams U and V are applied to an encoder circuit ENC2 of END through a multiplexer circuit MUX1 which provides a combined chrominance bitstream C at its output. The encoder circuits ENC1 and ENC2 are controlled by various control signals BX, BY, PX, PY, ACT provided by a control circuit CC and their outputs E1 and E2 are connected to inputs of a network interface circuit NIC. Also the control signals DX, DY and PX, PY are applied to inputs of this circuit NIC whose outputs constitute the outputs PSNW1 and PSNW2 of the sender circuit SC.

The operation of the encoder circuit END and of the network interface circuit NIC will be described later.

The above mentioned control circuit CC includes a synchronisation and clock circuit SCC whose input is connected to the input VSE of the sender circuit SC and which is connected in cascade with a horizontal pixel address counter HPAC having outputs LP, HA and X, a vertical pixel address counter VPAC having outputs FP, VA and Y, and a so called displacement counter DC which is able to count up to n and whose output RP controls the reading of a Read-Only-Memory ROM. The ROM stores a pseudo-random series of n pairs of displacement values DX1, DY1 to DXn, DYn of the grid origin GO considered with respect to the origin DO. The ROM memory has outputs DX and DY which are connected to first inputs of adder circuits HAD and VAD and to the interface circuit NIC. The fixed coordinate values DOX and DOY are applied to the second inputs of HAD and VAD. The outputs HA and and HAD of HPAC and HAD are connected to the inputs of a comparator circuit HCR whose output HR constitutes the reset input of counters SUBX and SUPX. The counter SUBX is able to count the value p which is equal to the number of pixels in a horizontal line of a block, whilst the counter SUPX is able to count the value q, which is equal to the number of blocks in a horizontal strip of blocks of the grid GR. The output CL of SCC is connected to the step input of SUBX and the block output BP of SUBX is connected to the step input of SUPX. SUBX and SUPX have address outputs BX and PX which are connected to encoder circuits ENC1 and ENC2 forming part of the encoder device END.

Likewise, the outputs VA and VAD of VPAC and VAD are conneted to the inputs of a comparator circuit VCR whose output VR constitutes the reset input of counters SUBY and SUPY. The counter SUBY is able to count the value r which is equal to the number of horizontal lines in a block, whilst the counter SUPY is able to count the value s which is equal to the number of horizontal strips of blocks of the grid GR. The output LP of HPAC is connected to the step input of SUBY and a strip output SP of SUBY is connected to the step input of SUPY. SUBY and SUPY have address outputs BY and PY which are connected to ENC1 and ENC2 of the encoder device END.

The outputs X and Y of the counters HPAC and VPAC are connected to the AND-gate AND whose output ACT is also connected to the encoder circuits ENC1 and ENC2.

The control circuit CC operates as follows. The synchronization and clock circuit SCC for instance includes a phase-locked loop circuit (not shown) which derives the above mentioned sender clock signal CL from the analog video signals supplied to its input VSE. This clock signal CL drives the counter HPAC which provides at its output HA the successive horizontal addresses of the pixels of each horizontal scanning line of the scanning field SF. These addresses are counted with respect to the origin FO of the field SF, homologous pixels in the horizontal lines having the same horizontal address but a different vertical address. At the end of each count the counter HPAC provides on its output LP a like named line pulse LP. The counter HPAC also activates its output X when the horizontal address generated at the output HA is comprised between the horizontal addresses of the pixels forming the left and right sides of the image area AA.

The line pulses LP generated at the output of the counter HPAC drive the counter VPAC which provides at its output VA the successive vertical addresses of the horizontal scanning lines of the scanning field SF. These addresses are also counted with respect to the field origin FO. At the end of each count the counter VPAC provides on its output FP a like named field pulse FP. The counter VPAC also activates its output Y when the vertical address generated at the output VA is comprised between the vertical addresses of the pixels forming the upper and lower sides of the image area AA.

Because the output signals X and Y are applied to the AND-gate AND it is clear that the output ACT thereof is activated when a pixel belongs to the image area AA.

The field pulses FP generated at the output of the counter VPAC drive the displacement counter DC and at each step the latter reads a distinct one of the pseudo-random series of n pairs of values DX1, DY1 to DXn, DYn stored in the ROM. It generates this pair at the output DX, DY of the ROM. By using this new pair of displacement values DX, DY the origin GO of the picture grid GR is displaced and so are its constituent blocks. This means that the addresses or coordinates of the pixels in a block and of the blocks in the displaced grid are different from those in the previous grid. These coordinates are generated in the way described hereinafter.

Because DX and DOX are applied to the adder circuit HAD the latter provides at its output HAD the horizontal address of the grid origin GO considered with respect to FO. Likewise, the adder circuit VAD provides at its output VAD the vertical address of this origin GO also considered with respect to FO. When the comparator HCR detects that the horizontal address HA provided by the counter HPAC equals the address HAD it activates its reset output HR due to which both the counters SUBX and SUPX are reset to zero. Likewise, when the comparator VCR detects that the vertical address provided by the counter VPAC equals the address VAD it activates its output VR and resets both the counters SUBY and SUPY to zero. Because the counter SUBX is stepped by the clock signal CL, it provides at its output BX the successive horizontal addresses or coordinates of the p pixels of each horizontal line of a block of the grid GR and starting from the grid origin GO. When the counter SUBX reaches the end of its count, i.e. when all the p pixels of a horizontal line of a block have been counted, it generates at its output BP a block pulse BP which steps the counter SUPX. The counter SUPX being stepped by the block pulses BP, it provides at its output PX the sucessive horizontal addresses or coordinates of the q blocks of a horizontal strip of blocks.

Likewise, the counter SUBY being stepped by the line pulses LP, it provides at its output BY the successive vertical addresses or coordinates of the horizontal lines of a strip of blocks of the grid GR. When the counter SUBY reaches the end of its count, i.e. when all the r horizontal lines of a strip of blocks have been counted, it generates at its output SP a strip pulse SP which steps the counter SUPY. The counter SUPY being stepped by the strip pulses SP, it provides at its output PY the successive vertical addresses of the horizontal strips of the grid GR.

From the above it follows that the control circuit CC generates the coordinates BX, BY of the pixels of each block, as well as the coordinates PX, PY of the blocks in the grid CR. It also indicates by means of signal ACT whether or not a pixel belongs to the image area AA.

To be noted that although the counters SUBX, SUPX, SUBY and SUPY also provide the coordinates of the pixels located outside the grid GR, this has no effect because the coding is then disabled, as will become clear later.

Figure 5:
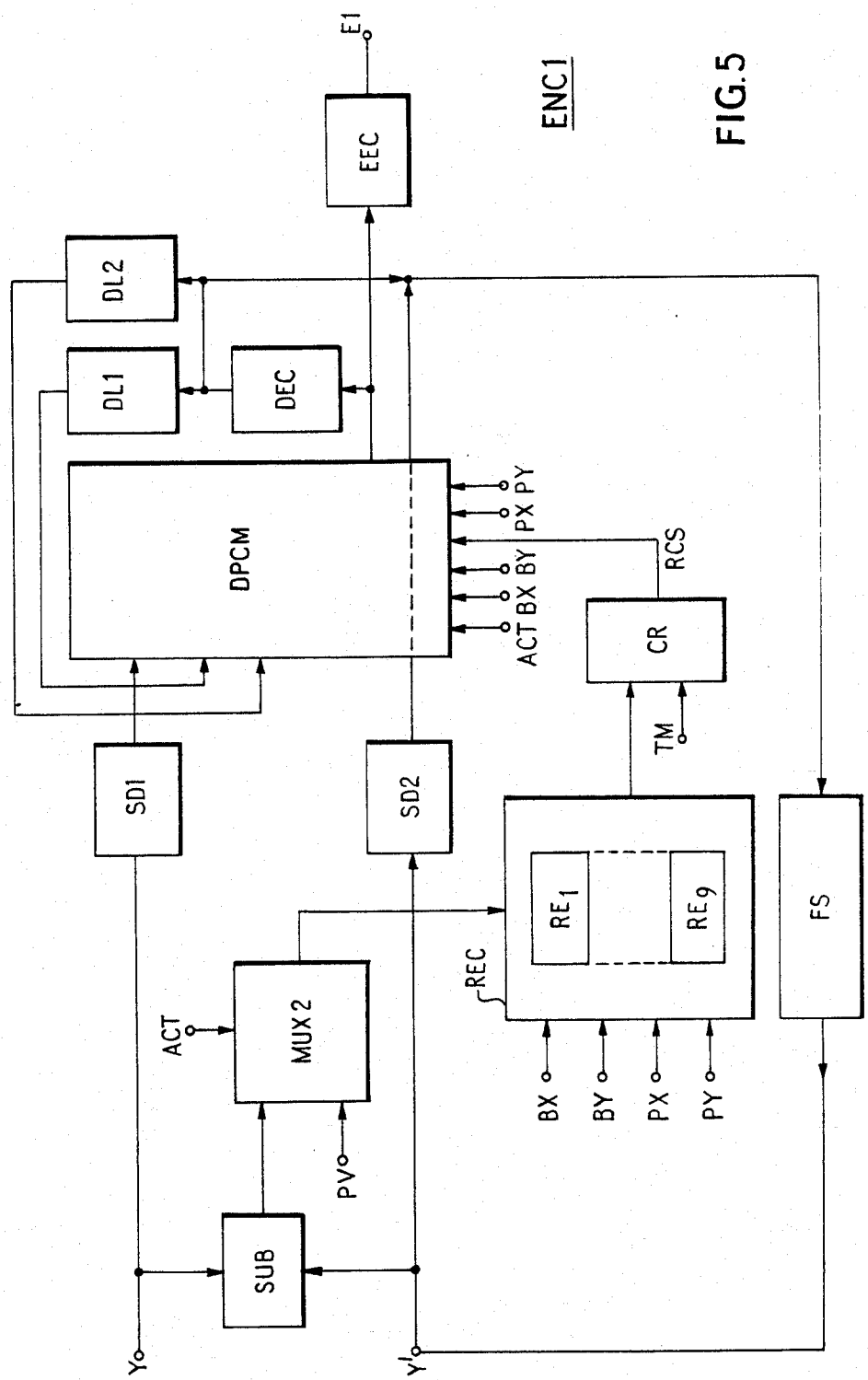
FIG. 5 shows a block diagram of the encoder circuit ENC1 of FIG. 4.

As mentioned above, the control signals BX, BY, PX, PY and ACT are supplied to the encoder circuits ENC1 and ENC2. The encoder circuit ENC1 is used for encoding the luminance bitstream Y, whereas the encoder circuit ENC2 serves for encoding the chrominance bitstream C appearing at the output of the multiplexer MUX1. Because both the encoder circuits ENC1 and ENC2 are identical only one of them, namely ENC1, is considered in detail hereinafter by making reference to FIG. 5.

This encoder circuit ENC1 includes a so-called frame store FS wherein the previous luminance values, called Y', for the pixels of the image area AA are stored. The frame store FS is essentially a FIFO and provides, together with a delay circuit SD2 and an encoder circuit DPCM, a delay corresponding to the scanning of one frame. The present value Y and the previous value Y' for a same pixel are supplied to a subtractor circuit SUB and also to an encoder circuit DPCM via respective ones of two identical delay circuits SD1 and SD2 which provide a delay equal to the time required for the scanning of the pixels of a strip of blocks of the grid, i.e. the time between two successive values of PY. In the subtractor circuit SUB the values of each corresponding pair of values Y and Y' for a pixel of the scanning field SF are subtracted and the absolute value of this difference is applied to a first input of a multiplexer circuit MUX2. To the second input of MUX2 is applied a predetermined value PV which is characteristic for a pixel of the grid GR which does not belong to the image area AA. The multiplexer MUX2 is controlled by the above mentioned signal ACT in such a way that depending on this signal ACT being activated or not either the output signal of the subtractor SUB or the predetermined value PV is applied to the input of a register circuit REC. The latter includes a number of registers RE1 to REq equal to the number q of blocks in a strip of the grid GR. The register circuit REC is not shown in detail, but is controlled by the control signals BX, BY, PX and PY so that the registers RE1 to REq are adapted to store the sums of the above difference values for the pixels of respective ones of the q blocks of a single strip of such blocks included in the grid GR. After the summing operation for the last register REq has been finished, i.e. after a delay equal to the scanning time for the pixels of a strip of blocks, the sum values registered in RE1 to REq are successively supplied to a comparator circuit CR wherein they are each compared with a threshold value TM. When the sum value for a block exceeds this threshold value TM an activated replenish command signal RCS is applied to a difference pulse code modulator DPCM. However, if this sum value is smaller than or is equal to the threshold value TM the signal RCS remains deactivated.

After the data concerning a strip of blocks have been processed the data for the following strip are stored in REC, etc.

As mentioned above, the pairs of values Y and Y' for all the pixels of the scanning field SF are applied to the encoder circuit DPCM via the delay circuits SD1 at SD2 respectively. But because DPCM is controlled by ACT, BX, BY, PX, PY only the signals relating to pixels of the image area AA are able to be processed therein. On the other hand due the delay in these delay circuits the luminance values Y and Y' for the pixels of the successive strips of grid blocks of the scanning field SF are supplied to the DPCM together with the corresponding signals RCS for these grid blocks.

If the signal RCS for a grid block is deactivated the luminance values Y' for the pixels of the image block, incorporated in this grid block, are fed back from DPCM to the frame store FS, whereas when the signal RCS is activated the DPCM is operated. It then calculates for each value of Y for a pixel the difference of this value and a prediction value which is equal to a weighted sum of the following three values:

the luminance value for the immediately preceding pixel on the same horizontal line. This value is obtained by decoding the encoded output value provided by DPCM in a decoder DEC and delaying the resulting signal in a delay unit DL1 over a time interval equal to that required for the scanning of one pixel;

the luminance value for the homologous pixel of the immediately preceding horizontal line. This value is obtained by decoding the above resultant signal in a delay unit DL2 over a time interval required for the scanning of one line of the scanning field SF;

the luminance value Y' for the homologous pixel of one of the previous frames obtained at the output of the delay circuit SD2.

The signals appearing on the output of the decoder circuit DEC are also fed back to the frame store FS. The encoded signals at the output of DPCM are supplied to an entropy encoder circuit EEC which is not shown in detail and wherein these signals are entropy encoded. This means that the output signals of DPCM which statistically have a high frequency of occurrence are assigned a short code, whereas the output signals which statistically have a low frequency of occurrence are assigned a long code. The entropy encoded data bitstream at the output E1 of EEC is designated E1 and has a variable bitrate because the coding operations in DPCM and EEC are not continuous.

The data bitstream E1 is supplied to the network interface circuit NIC together with the above mentioned control signals DX, DY, PX and PY and the same is true for the bitstream E2 generated at the output of the encoder circuit ENC2. In the interface circuit NIC these data bitstreams E1 and E2 are transmitted via corresponding outputs PSNW2 and PSNW3 to the packet switching network PSNW. More particularly, for the signals of each strip the NIC forms a so-called video packet which contains the following fields:
A flag indicating the start of the packet;
PY;
DX:
DY;
PX and the encoded data for the corresponding block. This is done for each of the blocks of the strip.

The NIC then transmits each video packet to PSNW under the form of so-called network packets, each such packet being the smallest amount of data able to be transmitted over PSNW. The databits of each such packet follow each other at a rate of e.g. 280 Mbit/sec. However, due to the gaps between these packets the bitrate of the bitstream is smaller than 280 Mb/sec. and variable. The fast packet switching network PSNW transmits these packets to a wanted receiver station, e.g. RC, VTE, via a same network route. Nevertheless small delay differences between the packets may occur.

In connection with the above it should be noted that, although the displacement values DX and DY may be corrupted due to transmission errors in the network PSNW, no error correction codes are associated to them because this would produce overhead. Instead, the receiver station synchronises to the received values DX and DY, as will be explained later.

Information on differential pulse code modulation and entropy can be found on pages 641-645 and 185-189 of the book "Digital Image Processing" by William K. Pratt, John Wiley and Sons, 1978. Further information on entropy is available in the book "Reference Data for Radio Engineers", fifth edition, Howard W. Sams and Co, Inc. New York, pp 38-3 to 38-16.

Figure 6:
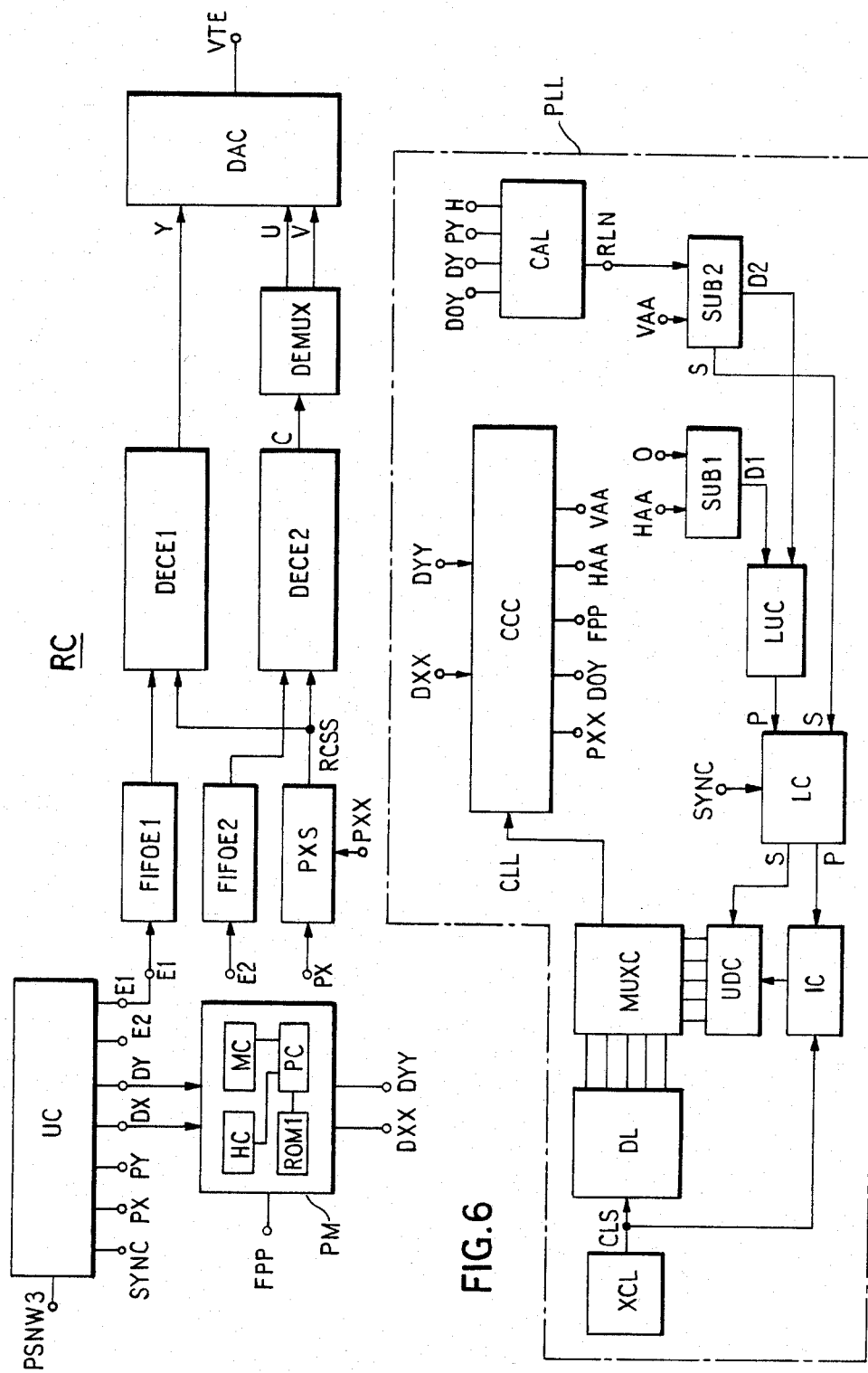
FIG. 6 represents a block diagram of the receiver circuit RC of FIG. 5.

Reference is now made to FIG. 6 which shows a block diagram of the receiver circuit RC of FIG. 1.

The above mentioned network packets are received in an unpacking circuit UC at the input PSNW3 as a bitstream from the packet switching network PSNW. In UC they are unpacked and the received control signals PX, PY, DX, DY and the entropy encoded data signals E1 and E2 are generated on the like named outputs PX, PY, DX, DY, E1 and E2 respectively. Also a reference or sync signal SYNC, indicating the receipt of data concerning a corresponding strip of blocks is generated on the like named output SYNC at each receipt of the flag of a video packet. This signal SYNC is applied to a latching circuit LC as an enabling signal. The control signal PX is registered in the PX storage circuit PXS which is used to store the identities of all the blocks for which data has been received and to provide a replenishment command signal RCSS. The outputs DX and DY are connected to processor means PM which are controlled by a field control pulse FPP and generate displacement values DXX and DYY on their like named outputs. The control pulse FPP is provided by a control circuit CCC which is similar to the control circuit CC of FIG. 4 and mainly differs therefrom in that it includes a phase locked loop PLL producing a clock signal CLL instead of a circuit SCC producing the clock signal CL. In response to the clock signal CLL the control circuit CCC generates various control signals which are designated PXX, DOY, FPP, HAA and VAA and are similar to PX, DOY, FP, HA and VA in FIG. 4.

The output signals E1 and E2 of the unpacking circuit UC are applied through respective FIFO circuits FIFOE1 and FIFOE2 to respective identical decoder circuits DECE1 and DECE2 which are also controlled by the above control replenishment signal RCSS. The output Y of DECE1 is directly connected to an input of a digital-to-analog converter DAC whose output constitutes the output VTE of the receiver circuit RC, whilst the output C of DECE2 is connected to inputs U and V of the DAC through a demultiplexer circuit DEMUX.

The processor means PM mentioned above and which are not shown in detail include a memory ROM1 which stores the same pairs of displacement values DX1, DY1 to DXn, DYn as the ROM of FIG. 4, as well as a miss counter MC, a hit counter HC and a processor circuit PC controlling ROM, HC and MC. The circuit PC executes one of the algorithms IN-SYNC and OUT-SYNC depending on the operation of the receiver circuit RC being synchronised or not to that of the sender circuit SC, as far as the displacement values DX and DY are concerned. This is necessary because, as already mentioned above, these displacement values are transmitted without an error correction code being associated to them.

Each time the control circuit CCC generates a new field pulse FPP the processor circuit PC compares the pair of received displacement values DX, DY provided by the circuit UC with an expected pair of displacement values which have been read from the ROM1 upon the occurrence of the previous field pulse FPP. This pair of expected values is equal to the pair of displacement values of the series following the pair received at the occurrence of this previous FPP. The processor circuit PC then executes one of the following algorithms, it being supposed that the miss and hit counters have both been reset to zero.

THE OUT-SYNC ALGORITHM

In case the compared values are different, the PC resets the hit counter HC to zero, whereas when they are equal it increments this counter HC by one. As long as the hit counter AC has not counted a predetermined number of hits the procedure is repeated at the occurrence of each new field pulse FPP and no displacement values are generated at the outputs DXX and DYY of the means PM. However, when the hit counter HC has counted this number of hits the processor circuit PC supplies the received displacement values which are called DXX, DYY to the control circuit CCC via its outputs DXX, DYY. It then starts the execution of the IN-SYNC algorithm.

THE IN-SYNC ALGORITHM

In case the above mentioned compared values are equal the PC resets the miss counter MC zero, whereas when they are different it increments this counter by one. As long as the miss counter MC has not counted a predetermined number of missings the procedure is repeated at the occurrence of each new field pulse FPP. However, when the miss counter MC has counted this number of missings the processor circuit again starts performing the OUT-SYNC algorithm.

From the above it follows that after a predetermined number of consecutive hits have been registered the receiver circuit is considered to be synchronized with the sender circuit and that after a predetermined number of consecutive missings have been registered the receiver is considered to be out of synchronism with the sender circuit. The values DXX, DYY at the output of the circuit PC are only used when the sender and receiver circuits are synchronized from the point of view of the displacement values. As already mentioned the values DXX and DYY are supplied to the control circuit CCC which provides the control signals PXX, DO4, FPP, AAA and VAA in response to the clock signal CLL being supplied thereat by the PLL circuit.

The control signal PXX is used to interrogate the above mentioned storage PXS in order to check if the value of PX corresponding to PXX is stored therein and only in the affirmative the replenish signal RCSS is activated, so that only then the operation of the decoder circuits DECE1 and DECE2 is enabled. When this happens the signals E1 and E2, after having been delayed in FIFOE1 and FIFOE2, may then be decoded. Each of these FIFOs buffers the delays introduced by the network PSNW. This is necessary because the data may be received too early or too late with respect to the clock signal CLL generated by the PLL circuit. To have a maximum buffering delay the FIFOs are so chosen that they are half full in the steady state condition.

The decoder circuits DEC1 and DEC2 each include the cascade connection of an entropy decoder circuit and a DPCM decoder circuit (not shown) and provide at their outputs Y and C the like named bitstreams Y and C. These are applied to a digital-to-analog converter DAC directly and via the DEMUX respectively, as already mentioned.

The PLL circuit includes a crystal clock XCL which generates a stable clock signal CL having a period equal to T. This clock signal CLS is supplied to a delay line DL having N taps on which N clock signals are generated which are shifted with respect to each other by a phase value equal to T/N. In a practical example T and N are for instance equal to about 30 nanoseconds and 6 respectively so that T/N is equal to about 5 nanoseconds. The N outputs of the delay line DL are connected to a multiplexer circuit MUXC which is controlled by an up-down counter UDC which is able to count N. The above mentioned control signals HAA and VAA are applied to the plus inputs of respective subtractor circuits SUB1 and SUB2 to the minus inputs of which the value 0 and the running line number RLN are applied respectively. The latter number is provided at the output of a calculator circuit CAL to which the above mentioned control signals DOY, DY and PY provided by the control circuit CCC and a constant signal H are applied. The outputs D1 and D2 of the subtractor circuits SUB1 and SUB2 are connected to a look-up circuit LUC and the output of the latter circuit and the sign output S of the subtractor circuit SUB2 are both connected to a latch circuit LC which is controlled by the control signal SYNC. The outputs S and P of the latch circuit LC are connected to an interval counter IC which is controlled by the clock signal CLS. The output of SC and the output S of LC control the counter UDC.

The PLL circuit operates as follows. As long as the clock signal CLL in the receiver circuit RC is not in synchronism with the clock signals CL in the sender circuit SC, a phase error exists in the receiver circuit RC. This phase error has for effect that the pixel positions in the receiver circuit RC differ from those in the sender circuit SC. To measure this phase error, at each receipt of data for the pixels of the blocks of a strip of the grid the position of the first of these pixels in the scanning field of the sender circuit SC is compared with the position of the first pixel in the scanning field of the receiver circuit RC. These positions are taken in the respective scanning fields because the scanning is performed along lines of this field and the phase error is dependent thereon.

The x-coordinate of the first pixel in the scanning field SF of the sender circuit SC is equal to 0 because this first pixel is located on the left vertical border line of this field, whilst the x-coordinate of the homologous first pixel in the scanning field SF of the receiver circuit RC is equal to the value of HAA at the moment of occurrence of the signal SYNC.

The y-coordinate of the above first pixel in the scanning field SF of the sender circuit is equal to:

$$RLN = DOY + DY + PY \cdot H \quad (1)$$

wherein H is the height of a block.

The y-coordinate of the homologous first pixel in the scanning field of the receiver circuit is equal to the value of HAA at the moment of occurrence of the signal SYNC.

The relation (1) is continuously calculated in the calculator circuit CAL and the differences D1 between HAA and 0 and D2 between VAA and RLN are continuously provided by the subtractors SUB1 and SUB2. Also the sign S of the phase error is given by the sign of D2 and is continuously provided at the output S of SUB2.

The difference signals D1 and D2 are supplied to the look-up circuit LUC wherein a phase error PE is calculated from these signals according to the following formula:

$$PE = D1 + mD2 \quad (2)$$

Herein m is the number of pixels in the horizontal line of the scanning field SF.

The look-up circuit LUC also includes a look-up table (not shown) which for each of the values of PE provides a value P indicating the speed whith which a phase correction has to be performed. More particularly, this tale is so programmed that the larger is the phase error PE the smaller is the time interval between successive phase corrections, i.e. the smaller is P. The values S and P are applied to the latch circuit LC wherein they are latched under the control of the signal SYNC so that they remain in this latch circuit for the duration of the receipt of the network packets of a video packet. Because the signal S and P are only evaluated at the moment of occurrence of the signal SYNC in the latch circuit LC, only the values P and S for the above mentioned first pixel are latched.

The latched value P is applied to the interval counter IC which steps counter UDC each time after having counted from the value P down to zero. The latched sign value S applied to the counter UDC determines whether this counter has to count up or down. Depending on the position of the counter after each step, one of the N inputs of the circuit MUXC is connected to the output thereof. The latter circuit thus provides one of the above mentioned N clock signals, i.e. CLL, and supplies it to the control circuit CCC.

It should be noted that because each phase change is equal to T/N, wherein T is derived from the fixed clock XCL, the minimum period of the clock is known and this is important for the design of the circuit. Indeed, by a step of the counter UDC the clock signal having a period T may for instance be switched to another clock signal which leads with respect to the first mentioned one, and this has for result that the first clock period of this other clock signal is equal to T−T/N. In the analog PLL, mentioned in the introduction, the minimum value of the clock period is not known exactly because the clock signal is generated by a voltage-controlled oscillator which always produces some jitter in the clock signal at the occurrence of a phase change.

While the principles of the invention have been described above in connection with specific apparatus, it is to be clearly understood that this description is made only by way of example and not as a limitation on the scope of the invention.

I claim:

1. Image processing system comprising at least one sender station and at least one receiver station, wherein each said sender station comprises
   image means for generating sets of signals, each set relating at least to the image elements of an image area,
   control means for subdividing the signals of each set into a plurality of groups corresponding to image blocks of said image area, said control means further comprising changing means for changing the subdivision algorithm used for subdividing from one set of signals to the next,
   encoding means for encoding said groups of signals, and
   transmission means for transmitting the thus obtained groups of encoded signals to said receiving station,
   and wherein each said receiving station comprises
   decoding means for reconstructing said image area by making use of said encoded signals.

2. Image processing system according to claim 1, wherein said transmission means transmits a subdivision signal indicative of the particular subdivision algorithm used by the control means to enable said image reconstruction to be performed.

3. Image processing system according to claim 1, wherein
   the signals of each of said sets relate at least to a grid which incorporates said image area, and
   said control means also subdivides the signals of each set into groups corresponding to grid blocks of said grid, said grid blocks also subdividing said image area into said image blocks.

4. Image processing system according to claim 3, wherein
   the signals of each of said sets relate at least to a scanning field which incorporates a said grid and
   said control means provides control signals to perform said subdividing, which relate to said grid having in said scanning field a position indicated by said subdivision signal.

5. Image processing system according to claim 4, wherein
   successive grids have different positions in the corresponding scanning fields which all have a same fixed position and
   the image areas have a same fixed position in the corresponding scanning fields.

6. Image processing system according to claim 4, wherein
   said subdivision signal indicative of said grid position is constituted by the coordinates of a vertex of said grid in a rectangular region, said grid being subdivided in square grid blocks and said region having a vertex with a fixed coordinates in said fixedly positioned scanning fields which are also rectangular, and
   a vertex of said image area, which is also rectangular, has coordinates in said rectangular region which are each equal to the width of a square grid block less the distance between two adjacent image elements, said vertex of said grid being displaceable between the positions of the vertexes of said region and of said image area.

7. Image processing system according to claim 2, wherein
said control means further comprises first memory means for storing a series of successive subdivision means signals to be used in successive subdivision operations and communicated to said receiver station and
said receiver station further comprises processor comprising
a hit counter,
a miss counter,
a second memory means also storing said series of successive subdivision signals, and
a processor circuit which at regular intervals compares the received subdivision signal with a subdivision signal selected during a previous interval and selects in said series the subdivision signal following the received indicative signal to be used in a following interval, and
said processor circuit is able to execute a first or a second algorithm, said first algorithm consisting in incrementing said hit counter and resetting said miss counter when said comparison is successful and in starting the execution of said second algorithm when said hit counter has counted a predetermined first value, the received indicative signal being then used for controlling said image reconstruction, and said second algorithm consisting in resetting said hit counter and incrementing said miss counter when said comparison is not successful and in starting the execution of said first algorithm when said miss counter has counted a predetermined second value.

8. Image processing system according to claim 1, wherein said encoder means provides at its output a bitstream having a variable bitrate which is transmitted to said receiver station by said transmission means.

9. Image processing system according to claim 8, wherein said encoder means further comprises a differential pulse code modulator circuit in series with an entropy encoder.

10. Image processing system according to claim 9, wherein said transmission means further comprises a packet switching network as well as an interface circuit which supplies said bitstream to said network in the form of packets having a variable bitrate.

11. Image processing system according to claim 10, wherein said transmission means also transmits to said receiver station control signals indicative of said blocks and reference signals.

12. Image processing system according to claim 3, wherein said encoder means is controlled by said control means in such a way that said signals relating to a particular said image block are encoded only when the signals relating to the grid block in which that particular image block is incorporated satisfy a predetermined criterion, as indicated by an activated block replenishment signal.

13. Image processing system according to claim 5 or 6, wherein
said encoder means is controlled by said control means in such a way that said signals relating to a particular said image block are encoded only when the signals relating to the grid block in which that particular image block is incorporated satisfy a predetermined criterion, as indicated by an activated block replenishment signal,
said signal generating means further comprises a video source equipment producing analog video signals for the image elements of each scanning field and an analog-to-digital converter for converting said analog video signals into digital video signals,
said control means further comprises
clock means for deriving a clock signal from said analog video signals and
counter means which is driven by said clock signal and controlled by said indicative signals to provide in said grid the coordinates of said grid blocks and image elements therein, as well as an image control signal indicating for each image element whether it belongs to said image area or not and
said coder means is controlled by said coordinates and said image control signal provided by said control means.

14. Image processing system according to claim 13, wherein said encoder means further comprises:
an encoder circuit controlled by the coordinates of said grid blocks and image elements and by said image control signal;
storage means for storing signals relating to the image elements of image blocks;
supply means for supplying to said encoder circuit each pair of signals provided by said converter means and by said storage means respectively and relating to a same image element;
subtracting means for providing the absolute value of the difference of said signals of said pair;
summing means also controlled by said coordinates and said image control signal;
gating means for coupling the output signal of said subtracting means and a fixed value to said summing means, said gating means being controlled by said image control signal in such a way that said absolute value or said fixed value is supplied to said summing means depending on said image control being activated or not respectively, said summing means calculating a sum value for the image elements of each image block;
comparison means for comparing the sum value provided by said summing means with a threshold value and for generating said activated replenishment signal only when said sum value exceeds said threshold value, said replenishment signal when activated enabling said encoder circuit to encode the signals related to the image elements of said image block, and said replenishment signals when deactivated enabling said signals issued from said storage circuit to be fed back to it.

15. Image processing system according to claim 14, wherein said encoder circuit is a differential pulse code modulator circuit which calculates an output value for an image element from the previous output value for the preceding image element on the same scanning line of the same scanning field, from the previous output value for an homologous image element as the previous scanning line of the same scanning field, and from the previous output value for an homologous image element on the same scanning line of a previous scanning field.

* * * * *